United States Patent [19]
Fox

[11] 3,847,037
[45] Nov. 12, 1974

[54] DUCT JOINING TOOL
[76] Inventor: Elmer E. Fox, 2149 Mildred Ave., Beloit, Wis. 53511
[22] Filed: June 25, 1973
[21] Appl. No.: 373,425

[52] U.S. Cl. ............... 81/5.1 R, 81/425 R, 72/409
[51] Int. Cl. ........................... B25b 7/00, B25b 7/02
[58] Field of Search ............... 81/5.1 R, 425; 72/409

[56] References Cited
UNITED STATES PATENTS

| | | | |
|---|---|---|---|
| 715,674 | 12/1902 | Lemon | 81/5.1 R |
| 891,509 | 6/1908 | Tanner | 81/425 R |
| 2,814,860 | 12/1957 | McCaleb | 81/5.1 R |
| 3,461,713 | 8/1969 | Donath | 81/5.1 R |

Primary Examiner—James L. Jones, Jr.
Attorney, Agent, or Firm—Dirk J. Veneman

[57] ABSTRACT

A duct joining tool in the form of a pair of pliers having convexly shaped duct engaging flanges mounted to the outer extremities of the work engaging portion thereof.

6 Claims, 3 Drawing Figures

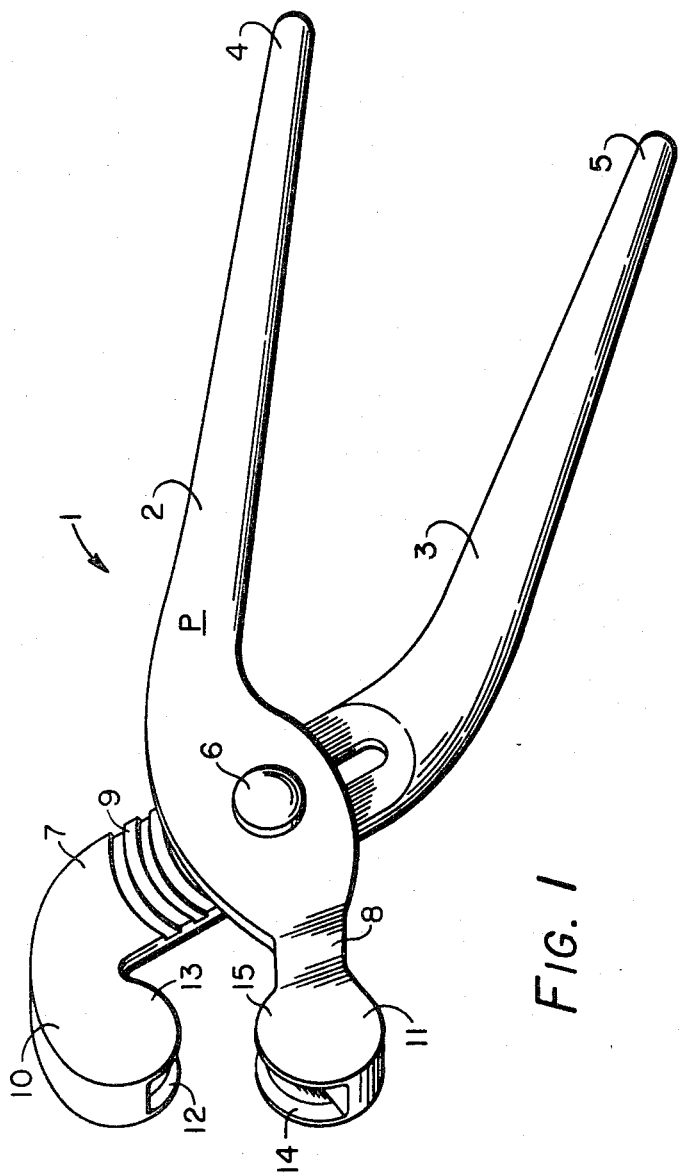
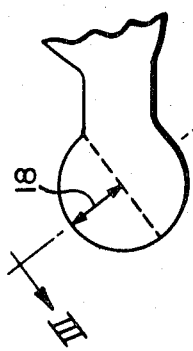
FIG. 1
FIG. 2
FIG. 3

DUCT JOINING TOOL

BACKGROUND OF THE INVENTION

This invention relates to new and useful improvements in tools for joining sheet metal ducts or the like.

The principal object of the present invention is to provide a tool of the character herein described, which may be conveniently and effectively employed for drawing the end portions of such ducts together, prior to their permanent fastening.

Another object of the present invention is to provide a tool which is simpler in construction and easily adaptable for economic manufacture.

A further object of the present invention is to provide a tool for use in assembling duct work which provides a positive grip on the flanges of the duct sections.

A still further object of the present invention is to provide a tool for use in assembling duct work which can be used in crowded areas and yet provide ease of access to the duct flanges to be clamped together.

With the above objects in view and such other objects as may become apparent as this specification proceeds, the invention resides in the details of construction and operation as more fully hereinafter is described and claimed, reference being had to the accompanying drawings forming a part hereof, in which:

BRIEF DESCRIPTION OF THE DRAWINGS

FIG. 1 is a perspective view of the invention;

FIG. 2 is a partial side view of a portion of the structure of the present invention; and FIG. 3 is a cross-sectional view taken along the lines 1—1 of FIG. 1.

DESCRIPTION OF THE PREFERRED EMBODIMENT

In assembling duct sections to form a duct, the respective C-shaped flanges on a pair of duct sections are brought into abutting relation, and a generally C-shaped channel member is then passed about the flanges to provide a relatively air tight rigid connection between the two duct sections. Heretofore, difficulty has been more or less universally experienced in attempting to hold the flanges in abutting relation while the C-shaped channel member is slipped onto the duct flanges from the end thereof. The task is generally unwieldy since there are no means available to positively grip the flanges and the means employed are often makeshift and slip off the flanges prior to the placement of the channel member about the flanges. In order to prevent such slippage, the workman installing the duct work manipulates whatever tool he is using in a manner to subject the flanges to an excessive amount of force which usually results in the flanges being distorted thus rendering the step of slipping the C-shaped channel about the flanges even more difficult. When it is necessary for the workman installing the duct work in close quarters, manipulation of such makeshift tools is even more difficult and compounds the problem involved.

An exemplary form of the invention, generally designated 1, is shown in FIG. 1. The tool 1 includes a pair of elongate arm members 2 and 3 having handle portions 4 and 5, respectively, at the ends thereof. The elongate members 2 and 3 are connected to each other by means of a pivot 6 intermediate their ends. The elongate members 2 and 3 further include work engaging portions 7 and 8, the structural details of which will be described in detail hereinafter. The structure thus far described further includes a standard channel lock section designated at 9 so that the work engaging portions 7 and 8 can be pulled to a fixed stop in stages so as to facilitate the pulling together of duct sections which are spaced apart by more than the width of the C-shaped channel member used to join the duct sections together. The structural details of the channel lock section 9 are well known to those versed in the art and need not be described in detail.

The general configuration of the work engaging portions 7 and 8 is similar to those of a standard pair of channel lock pliers. Specifically, work engaging portion 7 is generally C-shaped and curves inwardly, while work engaging portion 8 is generally straight.

The forward or terminal portions 10 and 11 of each of the work engaging portions 7 and 8 are provided with spaced apart half round or C-shaped flanges 12–13 and 14–15, respectively. The flanges 12–13 and 14–15 may be of any suitable shape as long as they are convexly shaped, that is, the flanges should not be flat, since it is important to be able to permit a rocking motion of the tool whereby the channel sections can be urged together with the correct amount of force, by varying the moment arm, so as to avoid damage to the flanges of the duct sections.

As previously described, the forward portions 10 and 11 of the tool 1 are each provided with a pair of flanges 12–13 and 14–15. Using pairs of flanges makes this tool uniquely adaptable for left- or right-handed workmen and simultaneously provides for easy use of the tool in forcing together upper, lower, forward or rearward flanges of the duct sections to be joined. The flanges 12–13, 14–15 are mounted in the plane P of the tool 1 thus providing for easy access to the flanges of duct sections in close quarters.

The flanges 12–13 and 14–15 are tapered or beveled so as to permit the C-shaped channel member joining the duct sections to be easily slipped in place. In a typical form of the invention, the flanges 12–13 and 14–15 may have a thickness at the base 16 of one-eighth inch and a thickness 17 of one thirty-second inch at the outer extremity. The maximum height 18 of each flange may be in the order of one-half inch.

Production of the tool of the present invention can be easily implemented. A high grade tool steel will be a suitable fabrication material and the basic shapes can be attained by means of forging. Heat treatment may be employed to obtain the desired physical properties. The expenditures required for the manufacture of the tool can thus be held within reasonable limits.

It will be evident from the foregoing detailed description that the present invention provides a tool for easily and quickly aligning and bringing into abutting relation duct sections. The tool of the present invention is inexpensive yet rugged and has a versatility not present in devices heretofore used in the prior art.

Although the invention has been shown in connection with a certain specific embodiment, it will be readily apparent to those skilled in the art that various changes in the form and arrangement of parts may be made to suit requirements without departing from the spirit and scope of the present invention.

I claim as my invention:

1. A duct joining tool comprising a pair of arms disposed in crossed relation, a pivot means extending through said arms at their point of crossing and connecting said arms together for relative pivotal movement, said arms including a pair of cooperating handle portions at one end and a pair of opposing work engaging portions at the other end, each said work engaging portions including a convexly shaped inwardly facing duct engaging flange connected to an end portion of each said work engaging portions.

2. The structure of claim 1 wherein one of said work engaging portions is substantially C-shaped.

3. The structure of claim 2 wherein the other of said work engaging portions is substantially straight.

4. The structure of claim 1 wherein each said work engaging portions include a pair of spaced apart convexly shaped inwardly facing duct engaging flanges, each said pair of flanges connected to an end portion of each said work engaging portions.

5. The structure of claim 1 wherein said flanges are round.

6. The structure of claim 1 wherein said flanges are tapered.

* * * * *